(12) United States Patent
Kwasniewski et al.

(10) Patent No.: US 11,815,174 B1
(45) Date of Patent: Nov. 14, 2023

(54) DIFFERENTIAL CARRIER ASSEMBLY

(71) Applicant: ArvinMeritor Technology, LLC, Troy, MI (US)

(72) Inventors: Dale L Kwasniewski, Troy, MI (US); Mahesh I. Naik, Bangalore (IN)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/893,287

(22) Filed: Aug. 23, 2022

(51) Int. Cl.
| | |
|---|---|
| *F16H 57/037* | (2012.01) |
| *F16H 57/021* | (2012.01) |
| *F16H 48/08* | (2006.01) |
| *F16H 57/02* | (2012.01) |
| *B60K 17/36* | (2006.01) |
| *F16H 48/40* | (2012.01) |
| *F16H 48/42* | (2012.01) |

(52) U.S. Cl.
CPC .......... *F16H 57/037* (2013.01); *F16H 48/08* (2013.01); *F16H 57/021* (2013.01); *B60K 17/36* (2013.01); *F16H 2048/405* (2013.01); *F16H 2048/423* (2013.01); *F16H 2057/02052* (2013.01)

(58) Field of Classification Search
CPC .......... B60K 17/36; F16H 2057/02052; F16H 57/037; F16H 57/021; F16H 2048/405
See application file for complete search history.

(56) References Cited

U.S. PATENT DOCUMENTS

| | | | |
|---|---|---|---|
| 5,758,550 A * | 6/1998 | Lenczyk ................. | F16C 7/023 74/579 E |
| 6,813,972 B2 * | 11/2004 | Guo ........................ | F16H 48/08 74/606 R |
| 8,398,520 B1 | 3/2013 | Bassi et al. | |
| 9,267,596 B2 | 2/2016 | Trost | |
| 9,410,605 B2 | 8/2016 | Kluck | |
| 9,506,549 B2 | 11/2016 | Chandrashekar et al. | |
| 9,719,563 B2 | 8/2017 | Hirao | |
| 9,797,502 B2 * | 10/2017 | Hayes .................... | F16H 57/045 |
| 9,816,603 B2 | 11/2017 | Hayes et al. | |
| 10,113,628 B2 | 10/2018 | Kluck et al. | |
| 10,156,289 B2 | 12/2018 | De Stefani et al. | |
| 10,208,846 B2 | 2/2019 | Chinitz | |
| 10,364,872 B2 | 7/2019 | Keeney et al. | |
| 10,369,885 B2 | 8/2019 | Keeney et al. | |
| 10,378,634 B2 | 8/2019 | Kluck et al. | |
| 10,539,218 B2 | 1/2020 | Annigeri et al. | |
| 10,703,202 B2 | 7/2020 | Funderburg et al. | |
| 11,231,099 B2 | 1/2022 | Martin et al. | |
| 2005/0245342 A1 * | 11/2005 | Pontanari ................ | F16H 48/08 475/230 |
| 2022/0268349 A1 * | 8/2022 | Laforce .................. | F16H 37/082 |

FOREIGN PATENT DOCUMENTS

| | | | | |
|---|---|---|---|---|
| DE | 19925353 C1 * | 3/2000 | .......... | F16H 57/021 |
| WO | WO-2017102199 A1 * | 6/2017 | | |

* cited by examiner

Primary Examiner — Ernesto A Suarez
Assistant Examiner — James J Taylor, II
(74) Attorney, Agent, or Firm — Brooks Kushman PC

(57) ABSTRACT

A differential carrier assembly having a differential, a differential carrier, and a differential bearing support. The differential carrier has a bearing support mount that may extend from a mounting flange of the differential carrier. The differential bearing support is mounted to the bearing support mount and receives a bearing assembly that rotatably supports the differential.

19 Claims, 6 Drawing Sheets

DIFFERENTIAL CARRIER ASSEMBLY

TECHNICAL FIELD

This relates to a differential carrier assembly that has a differential bearing support.

BACKGROUND

An axle assembly having a differential carrier is disclosed in U.S. Pat. No. 11,231,099.

SUMMARY

In at least one embodiment a differential carrier assembly is provided. The differential carrier assembly includes a differential, a differential carrier, and a differential bearing support. The differential is rotatable about a differential axis. The differential carrier includes a differential carrier body, a mounting flange, and a bearing support mount. The differential carrier body encircles a second axis and has a first end. The mounting flange is disposed opposite the first end. The mounting flange extends from the differential carrier body in a direction that extends away from the second axis. The mounting flange has a mounting flange face. The mounting flange face faces away from the first end and is adapted to engage an axle housing. The bearing support mount extends from the mounting flange toward the second axis. The bearing support mount is recessed from the mounting flange face such that the bearing support mount is disposed closer to the first end than the mounting flange face is disposed to the first end. The differential bearing support is mounted to the bearing support mount. The differential bearing support receives a bearing assembly that rotatably supports the differential.

The bearing support mount may have a first mount and a second mount. The second mount may be spaced apart from the first mount. A first mount fastener hole may extend from the first mount. A second mount fastener hole may extend from the second mount.

The differential carrier body may define a passage. The passage may extend from the mounting flange. The passage may include a through hole that extends from an exterior side of the differential carrier body. The passage may separate the first mount from the second mount.

A differential lock actuator mechanism may be received in the through hole. The differential lock actuator mechanism may extend to the differential bearing support. The differential bearing support may have a boss. The boss may extend into the passage. The boss may support the differential lock actuator mechanism. The boss may have an aperture. The differential lock actuator mechanism may extend into the aperture.

The differential bearing support may have a first fastener hole. A first sleeve may be received in the first fastener hole. The first sleeve may be received in the first mount fastener hole. A first fastener may extend through the first sleeve and may couple the differential bearing support to the first mount.

The differential bearing support may have a second fastener hole. The second fastener hole may be spaced apart from the first fastener hole. A second sleeve may be received in the second fastener hole. The second sleeve may be received in the second mount fastener hole. A second fastener may extend through the second sleeve and may couple the differential bearing support to the second mount.

The differential bearing support may be a unitary one-piece component that encircles the bearing assembly.

The differential bearing support may have a ring. The ring may encircle the bearing assembly. The differential bearing assembly may have an arm. The arm may extend from the ring at an oblique angle. The arm may define a fastener hole, such as the second fastener hole.

The mounting flange may have a notch. The notch may extend away from the second axis. The differential bearing support may have a tab. The tab may be received in the notch. The tab may extend from the arm.

In at least one embodiment a differential carrier assembly is provided. The differential carrier assembly includes a differential, a differential carrier, and a differential bearing support. The differential is rotatable about a differential axis. The differential has a ring gear mounting flange upon which a ring gear is disposed. The ring gear mounting flange is disposed in a ring gear mounting flange plane. The ring gear mounting flange plane is disposed substantially perpendicular to the differential axis. The differential axis is disposed in a differential axis plane. The differential axis plane is disposed substantially perpendicular to the ring gear mounting flange plane. The differential carrier includes a bearing support mount. The bearing support mount has a first mount fastener hole and a second mount fastener hole. The first mount fastener hole is disposed above the differential axis plane. The second mount fastener hole is disposed below the differential axis plane. The first mount fastener hole is disposed further from the ring gear mounting flange plane than the second mount fastener hole is disposed from the ring gear mounting flange plane. The differential bearing support is mounted to the bearing support mount. The differential bearing support receives a bearing assembly that rotatably supports the differential.

The differential carrier assembly may include an input shaft. The input shaft may be rotatable about a first axis. The first axis may be disposed closer to the ring gear mounting flange plane than the first mount fastener hole. The first axis may be disposed further from the ring gear mounting flange plane than the second mount fastener hole.

The first mount fastener hole may be disposed closer to the differential axis plane than the second mount fastener hole may be disposed to the differential axis plane.

The differential carrier may include a bearing support having first and second legs that protrude past the mounting flange and out of the differential carrier body. The bearing support may support a second bearing assembly that rotatably supports the differential. The first leg may have a first leg fastener hole. The first leg fastener hole may be disposed above the differential axis plane. The first leg fastener hole may be disposed closer to the differential axis plane than the first mount fastener hole is disposed to the differential axis plane. The second leg may have a second leg fastener hole. The second leg fastener hole may be disposed below the differential axis plane. The second leg fastener hole may be disposed closer to the differential axis plane than the second mount fastener hole is disposed to the differential axis plane.

DETAILED DESCRIPTION

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a". "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or comprising, when used in this specification, specify the presence of stated features, integers, steps, operations, elements, and/or components, but do not preclude the presence or addition of one or more other features, integers, steps, operations, elements, components, and/or groups thereof.

Figure 1:
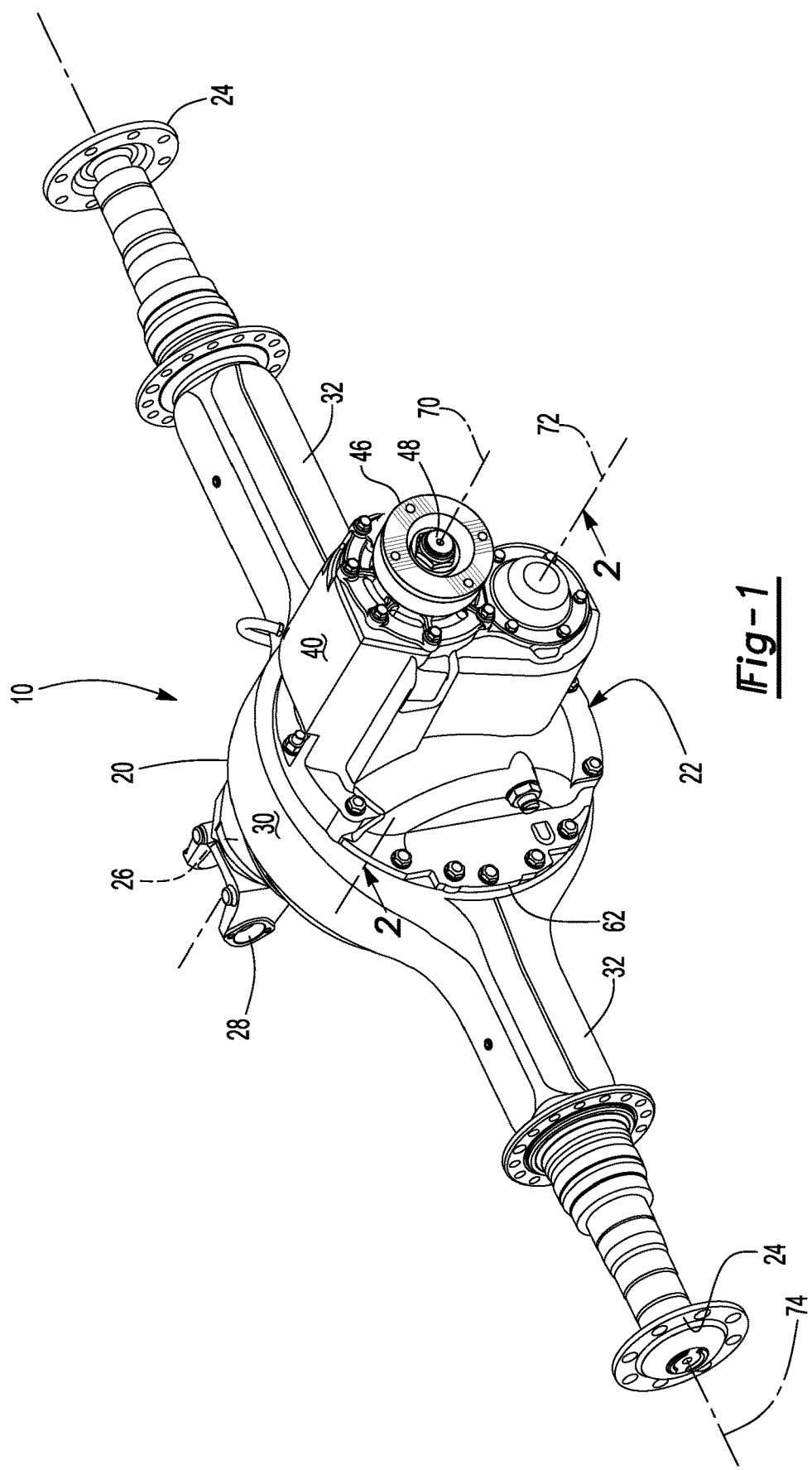
FIG. 1 is a perspective view of an example of an axle assembly having an axle housing and a differential carrier assembly.

Referring to FIG. 1, an example of an axle assembly 10 is shown. The axle assembly 10 may be provided with a vehicle of any suitable type, such as a truck, bus, farm equipment, military transport or weaponry vehicle, or cargo loading equipment for land, air, or marine vessels.

The axle assembly 10 may be part of a vehicle drivetrain that may include multiple axle assemblies that may be connected in series. For instance, the axle assembly 10 may be part of a tandem axle drivetrain configuration that may include two axle assemblies connected in series. The axle assembly 10 that is operatively connected to at least one torque source, such as an electric motor or an internal combustion engine, or that is disposed closest to a torque source may be referred to as a first axle assembly. The axle assembly that receives propulsion torque from the torque source through or by way of the first axle assembly may be referred to as a second axle assembly. In FIG. 1, the axle assembly 10 is depicted as being a first axle assembly.

The axle assembly 10 is configured to provide torque to its associated wheel assemblies and may provide torque to the second axle assembly. In at least one configuration and as is best shown with reference to FIGS. 1 and 2, the axle assembly 10 includes an axle housing 20 and a differential carrier assembly 22. The axle assembly 10 may also include at least one axle shaft 24, an output shaft 26, an output yoke 28, or combinations thereof.

Referring to FIG. 1, the axle housing 20 facilitates mounting of the axle assembly 10 to the vehicle. The axle housing 20 may receive various components of the axle assembly 10. For instance, the axle housing 20 may receive and may support the axle shafts 24. In at least one configuration, the axle housing 20 may include a center portion 30 and at least one arm portion 32.

The center portion 30 may be disposed proximate the center of the axle housing 20. The center portion 30 may define an opening and a cavity that may at least partially receive a differential of the differential carrier assembly 22. A lower region of the center portion 30 at least partially defines a sump portion that may contain or collect lubricant. Lubricant in the sump portion may be splashed or sprayed by a ring gear of the differential and distributed to lubricate various components.

One or more arm portions 32 may extend from the center portion 30. For example, two arm portions 32 may extend in opposite directions from the center portion 30. The arm portions 32 may have substantially similar configurations. For example, the arm portions 32 may each have a hollow configuration or tubular configuration that may extend around and may receive a corresponding axle shaft 24 and may help separate or isolate the axle shaft 24 or a portion thereof from the surrounding environment. Each arm portion 32 may support a wheel hub and a brake assembly that is configured to brake the wheel hub and hence brake a wheel that is mounted to the wheel hub. An arm portion 32 or a portion thereof may or may not be integrally formed with the center portion 30. It is also contemplated that the arm portions 32 may be omitted.

Figure 2:
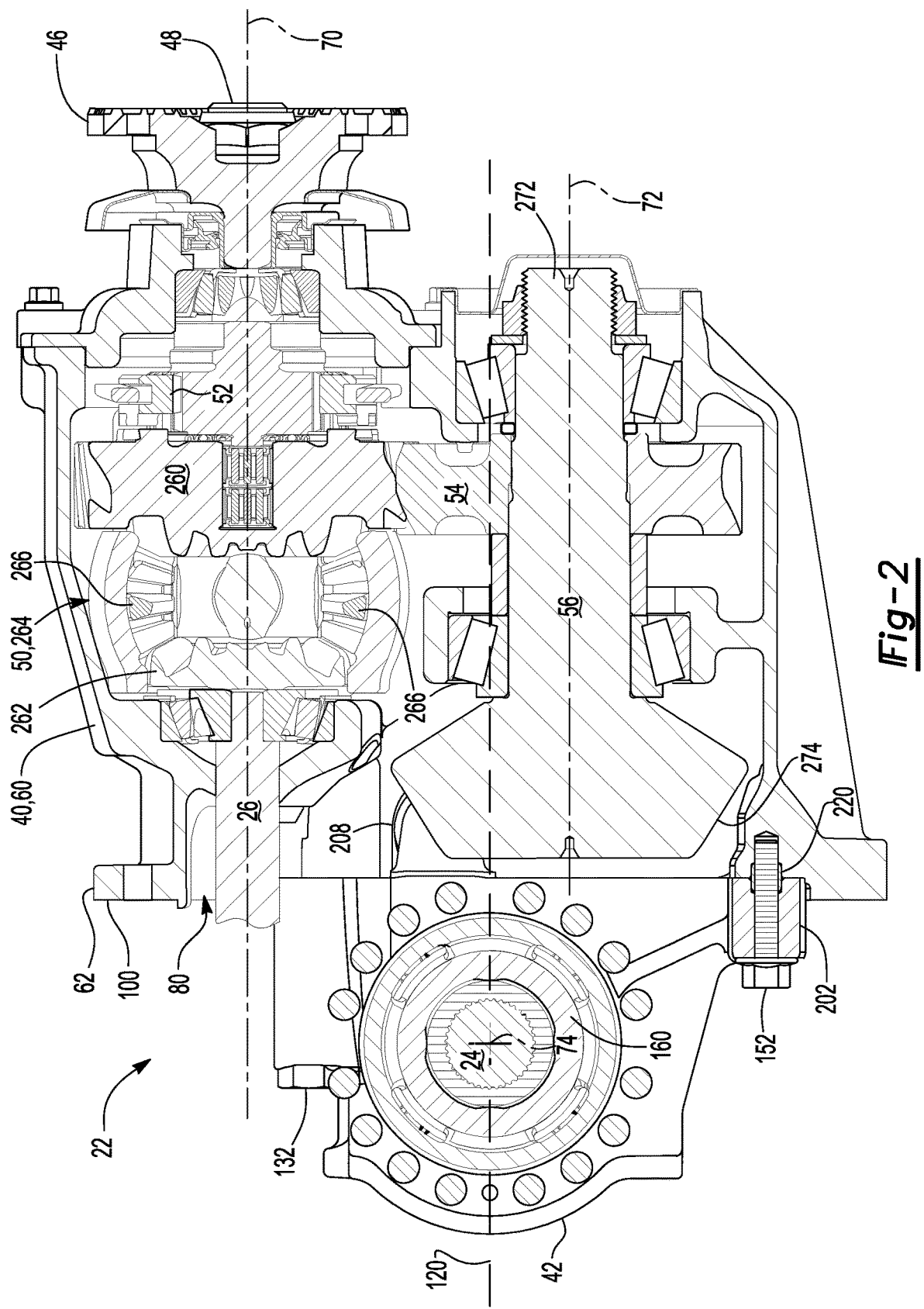
FIG. 2 is a section view of the differential carrier assembly along section line 2-2.
Figure 3:
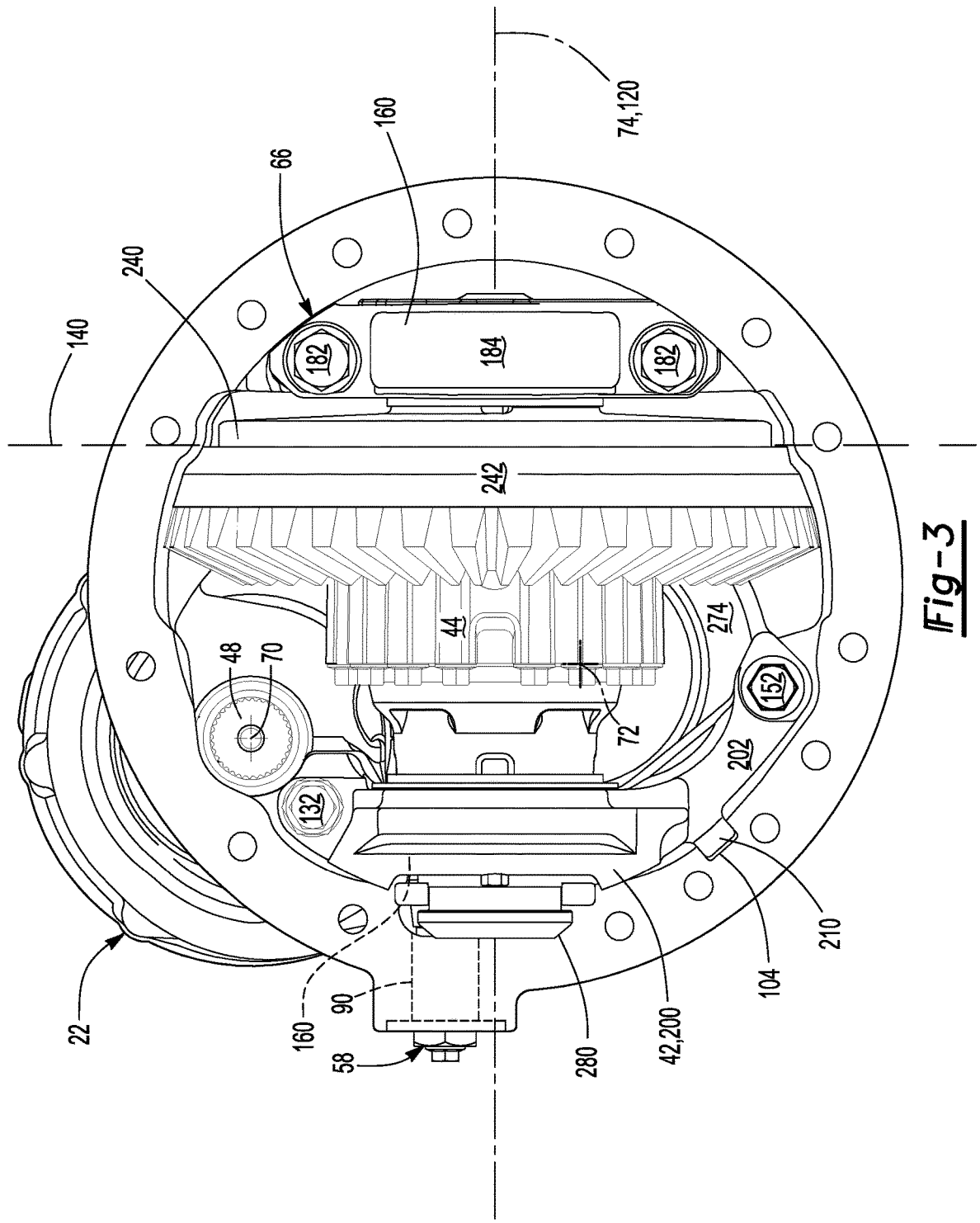
FIG. 3 is a side view of the differential carrier assembly.

Referring primarily to FIGS. 1 and 2, the differential carrier assembly 22 is mountable to the axle housing 20. As is best shown in FIG. 2, the differential carrier assembly 22 includes a differential carrier 40 and a differential bearing support 42 that cooperate to support and facilitate rotation of a differential 44 of the differential carrier assembly 22. The differential carrier assembly 22 may also include other components that facilitate the transmission of torque. For instance, the differential carrier assembly 22 may include an input yoke 46, an input shaft 48, an interaxle differential unit 50, a clutch collar 52, a driven gear 54, a drive pinion 56, or combinations thereof. Referring to FIG. 3, a differential lock actuator mechanism 58 may also be provided with the differential carrier assembly 22.

Referring to FIGS. 1 and 2, the differential carrier 40 is a structural member of the differential carrier assembly 22. The differential carrier 40 supports the differential 44 and is a housing that receives and/or supports the other components of the differential carrier assembly 22. The differential carrier 40 is removably mountable to the center portion 30 of the axle housing 20. In at least one configuration and as is best shown with reference to FIGS. 4 and 5, the differential carrier 40 includes a differential carrier body 60, a mounting flange 62, and a bearing support mount 64. The differential carrier 40 may also include a bearing support 66.

Figure 4:
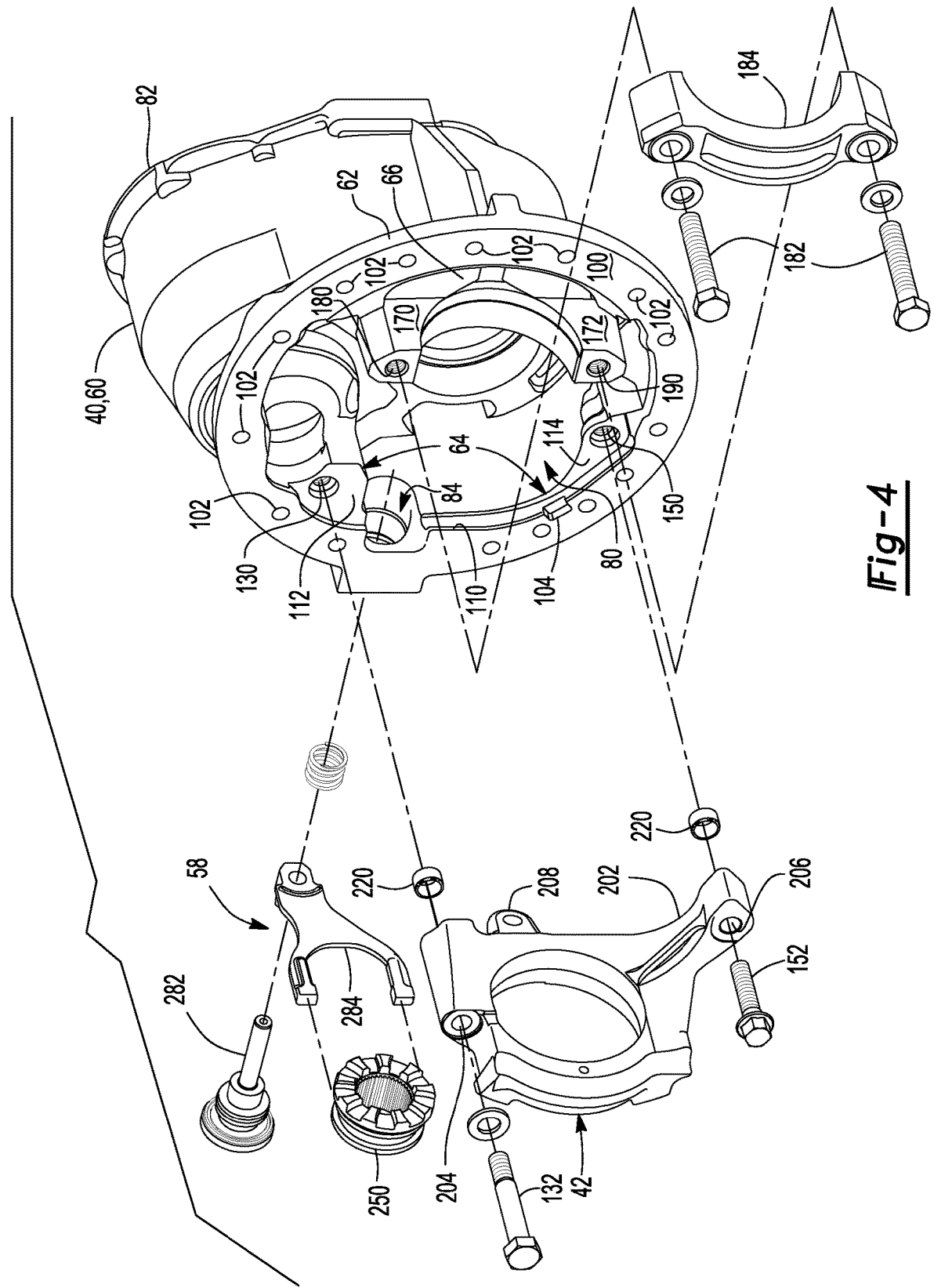
FIG. 4 is an exploded view of a portion of the differential carrier assembly.
Figure 5:
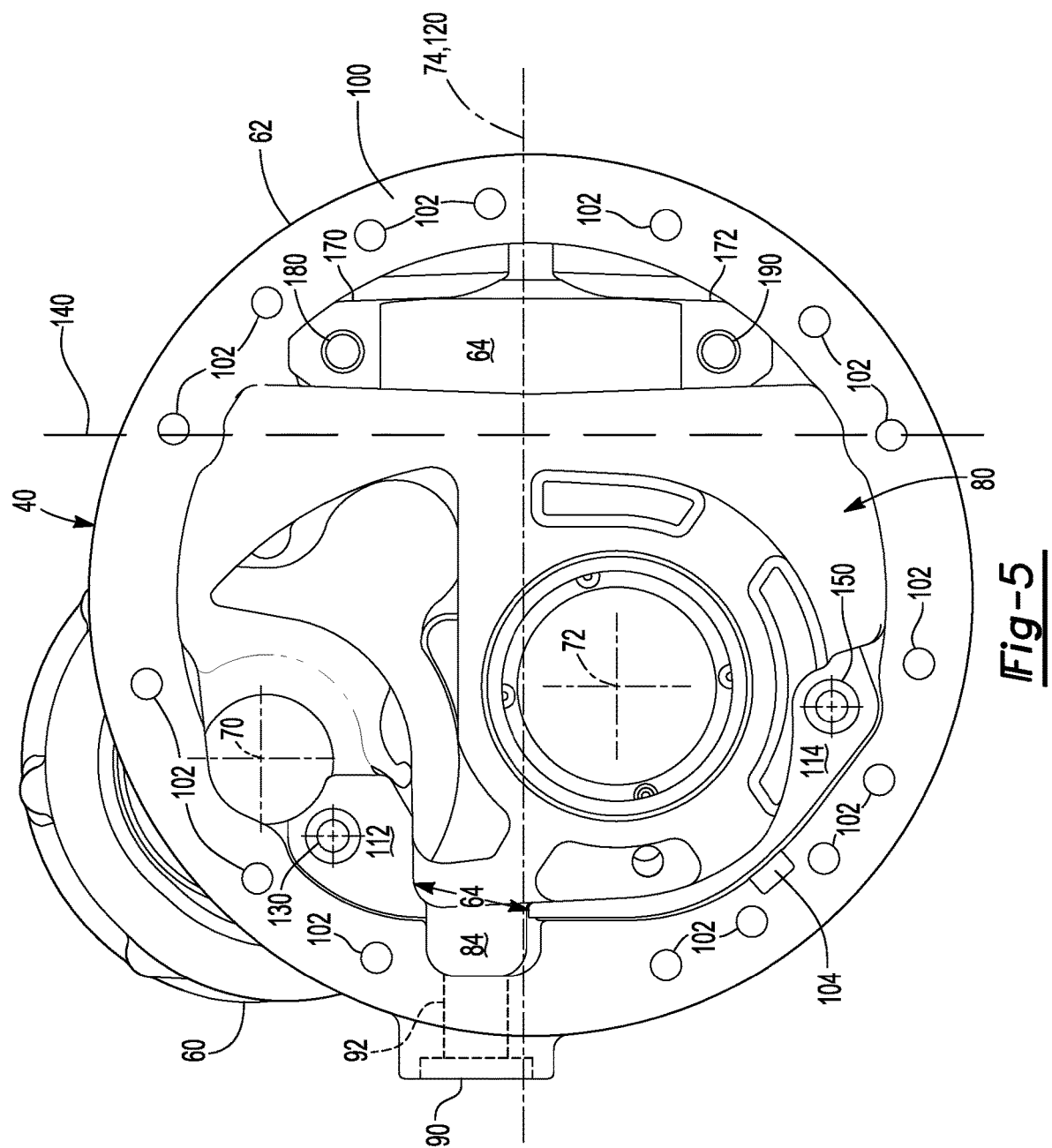
FIG. 5 is a side view of a differential carrier of the differential carrier assembly.

The differential carrier body 60 may be the outer housing of the differential carrier assembly 22. The differential carrier body 60 may be a generally hollow structure that may define a cavity 80 that may receive or encircle a majority of the components of the differential carrier assembly 22. As is best shown in FIG. 5, the differential carrier body 60 may encircle various axes of the axle assembly 10, such as a first axis 70 and a second axis 72. The first axis 70 may be disposed substantially parallel to the second axis 72. The term "substantially parallel" as used herein means the same as or very close to parallel and includes features or axes that are within ±3° of being parallel each other. As is best shown in FIG. 2, an axis of rotation of the differential 44 or differential axis 74 may be disposed outside of the cavity 80. The differential axis 74 may be disposed substantially perpendicular to the second axis 72. The term "substantially perpendicular" is used herein to designate features or axes that are the same as or very close to perpendicular and includes features that are within ±3° of being perpendicular each other. As is best shown in FIG. 4, the differential carrier body 60 may extend from a first end 82 to the mounting flange 62. The first end 82 of the differential carrier body 60 may face away from the axle housing 20 and may be disposed at an opposite end of the differential carrier body 60 from the mounting flange 62. In at least one configuration and as is best shown in FIGS. 4 and 5, the differential carrier body 60 may define a passage 84.

The passage 84 is disposed proximate the mounting flange 62. For instance, the passage 84 may extend from the mounting flange 62 toward the first end 82. The passage 84 may include a through hole 90 that extends from an exterior side 92 of the differential carrier body 60. The passage 84 may receive the differential lock actuator mechanism 58 or a portion thereof. The passage 84 may separate the bearing support mount 64 into first and second mounts 112, 114 as will be discussed in more detail below.

The mounting flange 62 is disposed opposite the first end 82 of the differential carrier body 60. The mounting flange 62 extends from the differential carrier body 60 in an outboard direction or a direction that extends away from the cavity 80. As such, the mounting flange 62 may extend away from the first axis 70 and the second axis 72. In at least one configuration, the mounting flange 62 has a mounting flange face 100 and may include a set of fastener holes 102 and a notch 104.

The mounting flange face 100 faces away from the first end 82 of the differential carrier body 60. The mounting flange face 100 may encircle the cavity 80 and is configured to contact or engage the axle housing 20. The mounting flange face 100 may be planar or substantially planar in one or more configurations.

The set of fastener holes 102 may be through holes that extend from the mounting flange face 100. Each fastener hole 102 may receive a fastener, such as a bolt, that may couple the mounting flange 62 to the center portion 30 of the axle housing 20.

The notch 104 may extend from the cavity 80 in an outward direction. For instance, the notch 104 may extend away from the second axis 72 and toward an outside perimeter or outside circumferential surface of the mounting flange 62. The notch 104 may be disposed proximate the bearing support mount 64. For instance, the notch 104 may extend outward with respect to the bearing support mount 64.

The bearing support mount 64 facilitates mounting of the differential bearing support 42. The bearing support mount 64 may be disposed proximate the mounting flange 62. For instance, the bearing support mount 64 may extend from the mounting flange 62 in an inward direction, such as into the cavity 80 or toward the second axis 72. The bearing support mount 64 may also extend inward from an exterior wall of the differential carrier body 60. In at least one configuration, the bearing support mount 64 is recessed from the mounting flange face 100. As such, the bearing support mount 64 is disposed closer to the first end 82 of the differential carrier body 60 than the mounting flange face 100 is disposed to the first end 82 of the differential carrier body 60. A step surface 110 may extend from the mounting flange face 100 to the bearing support mount 64. The step surface 110 may be disposed substantially perpendicular to the mounting flange face 100. The bearing support mount 64 may not encircle the cavity 80 and may be generally localized near a lateral side of the cavity 80 and a bottom side of the cavity 80. In at least one configuration, the bearing support mount 64 may have a first mount 112 and a second mount 114.

The first mount 112 may engage or contact the differential bearing support 42. The first mount 112 may be disposed above the second mount 114. As is best shown in FIG. 5, the first mount 112 may be disposed at a higher elevation than the differential axis 74 and may be disposed above a differential axis plane 120. The differential axis plane 120 may be a horizontal plane in which the differential axis 74 is completely disposed. The first mount 112 may include a first mount fastener hole 130.

Referring primarily to FIG. 4, the first mount fastener hole 130 receives a fastener 132, such as a bolt, that may couple the differential bearing support 42 to the bearing support mount 64. The first mount fastener hole 130 may extend from the first mount 112 in a direction that extends toward the first end 82 of the differential carrier body 60. As is best shown in FIG. 5, the first mount fastener hole 130 is disposed above the differential axis plane 120. In addition, the first mount fastener hole 130 is disposed further from a ring gear mounting flange plane 140 than the second axis 72 is disposed from the ring gear mounting flange plane 140, or further to the left from the perspective shown. As is best shown in FIG. 3, the ring gear mounting flange plane 140 may be disposed substantially perpendicular to the differential axis plane 120 and may extend along or through a ring gear mounting flange 240 of the differential 44 as will be discussed in more detail below.

Referring to FIG. 5, the second mount 114 may also engage the differential bearing support 42. The second mount 114 may be disposed below the first mount 112. As is best shown in FIG. 5, the second mount 114 or a portion thereof may be disposed at a lower elevation than the differential axis 74 and may be disposed below the differential axis plane 120. As is best shown in FIG. 4, the passage 84 may be disposed between the first mount 112 and the second mount 114. As such, the passage 84 may separate the first mount 112 from the second mount 114 such that the first mount 112 may be disposed above the passage 84 and the second mount 114 may be disposed below the passage 84. In at least one configuration, the second mount 114 may extend downward from the passage 84 and then curve or extend inward toward the ring gear mounting flange plane 140. As is best shown in FIG. 5, the second mount 114 may extend below the second axis 72 and may include a second mount fastener hole 150.

Referring primarily to FIG. 4, the second mount fastener hole 150 receives a fastener 152, such as a bolt, that may couple the differential bearing support 42 to the bearing support mount 64. The second mount fastener hole 150 may extend from the second mount 114 in a direction that extends toward the first end 82 of the differential carrier body 60. As is best shown in FIG. 5, the second mount fastener hole 150 is disposed below the differential axis plane 120. The first mount fastener hole 130 may be disposed closer to the differential axis plane 120 than the second mount fastener hole 150 is disposed to the differential axis plane 120. As such, the first mount fastener hole 130 and the second mount fastener hole 150 are not equidistantly spaced from the differential axis 74 and the differential axis plane 120. In addition, the first mount fastener hole 130 may be disposed further from the ring gear mounting flange plane 140 than the second mount fastener hole 150 is disposed from the ring gear mounting flange plane 140. The second mount fastener hole 150 may be disposed further from the ring gear mounting flange plane 140 than the second axis 72 is disposed from the ring gear mounting flange plane 140, or further to the left from the perspective shown in FIG. 5. In addition, the second mount fastener hole 150 may be disposed closer to the ring gear mounting flange plane 140 than the first axis 70 is disposed to the ring gear mounting flange plane 140.

Referring to FIG. 3, the bearing support 66 receives and supports a bearing assembly 160 that rotatably supports the differential 44. As is best shown in FIGS. 4 and 5, the bearing support 66 may have a first leg 170 and a second leg 172. The first leg 170 and the second leg 172 may protrude out of the cavity 80 and the past the mounting flange 62 and the mounting flange face 100.

Referring primarily to FIG. 5, the first leg 170 is disposed above the differential axis 74 and the differential axis plane 120. The first leg 170 has a first leg fastener hole 180.

Referring primarily to FIG. 4, the first leg fastener hole 180 receives a fastener 182, such as a bolt, that may couple a bearing cap 184 to the first leg 170. The first leg 170, the second leg 172, and the bearing cap 184 may cooperate to encircle the bearing assembly 160. The first leg fastener hole 180 may extend from distal end of the first leg 170 of in a direction that extends toward the first end 82 of the differential carrier body 60. As is best shown in FIG. 5, the first leg fastener hole 180 is disposed above the differential axis plane 120. In addition, the first leg fastener hole 180 may be disposed closer to the differential axis plane 120 than the first mount fastener hole 130 is disposed to the differential axis plane 120. The first leg fastener hole 180 is disposed closer to the ring gear mounting flange plane 140 than the second axis 72, the first mount fastener hole 130, and the second mount fastener hole 150 are disposed to the ring gear mounting flange plane 140.

Referring primarily to FIG. 5, the second leg 172 may be spaced apart from the first leg 170. The second leg 172 Is disposed below the differential axis 74 and the differential axis plane 120. The second leg 172 has a second leg fastener hole 190.

Referring to FIG. 4, the second leg fastener hole 190 receives a fastener 182, such as a bolt, that may couple the bearing cap 184 to the first leg 170. The second leg fastener hole 190 may extend from distal end of the second leg 172 of in a direction that extends toward the first end 82 of the differential carrier body 60. As is best shown in FIG. 5, the second leg fastener hole 190 is disposed below the differential axis plane 120. The first leg fastener hole 180 and the second leg fastener hole 190 may be equidistantly spaced from the differential axis 74 and the differential axis plane 120. The second leg fastener hole 190 may be generally aligned with the first leg fastener hole 180 such that the first leg fastener hole 180 in the second leg fastener hole 190 are disposed at substantially the same distance from the ring gear mounting flange plane 140. As such, first leg fastener hole 180 is disposed closer to the ring gear mounting flange plane 140 than the second axis 72, the first mount fastener hole 130, and the second mount fastener hole 150 are disposed to the ring gear mounting flange plane 140. In addition, the second leg fastener hole 190 may be disposed closer to the differential axis plane 120 than the second mount fastener hole 150 is disposed to the differential axis plane 120.

Figure 6:
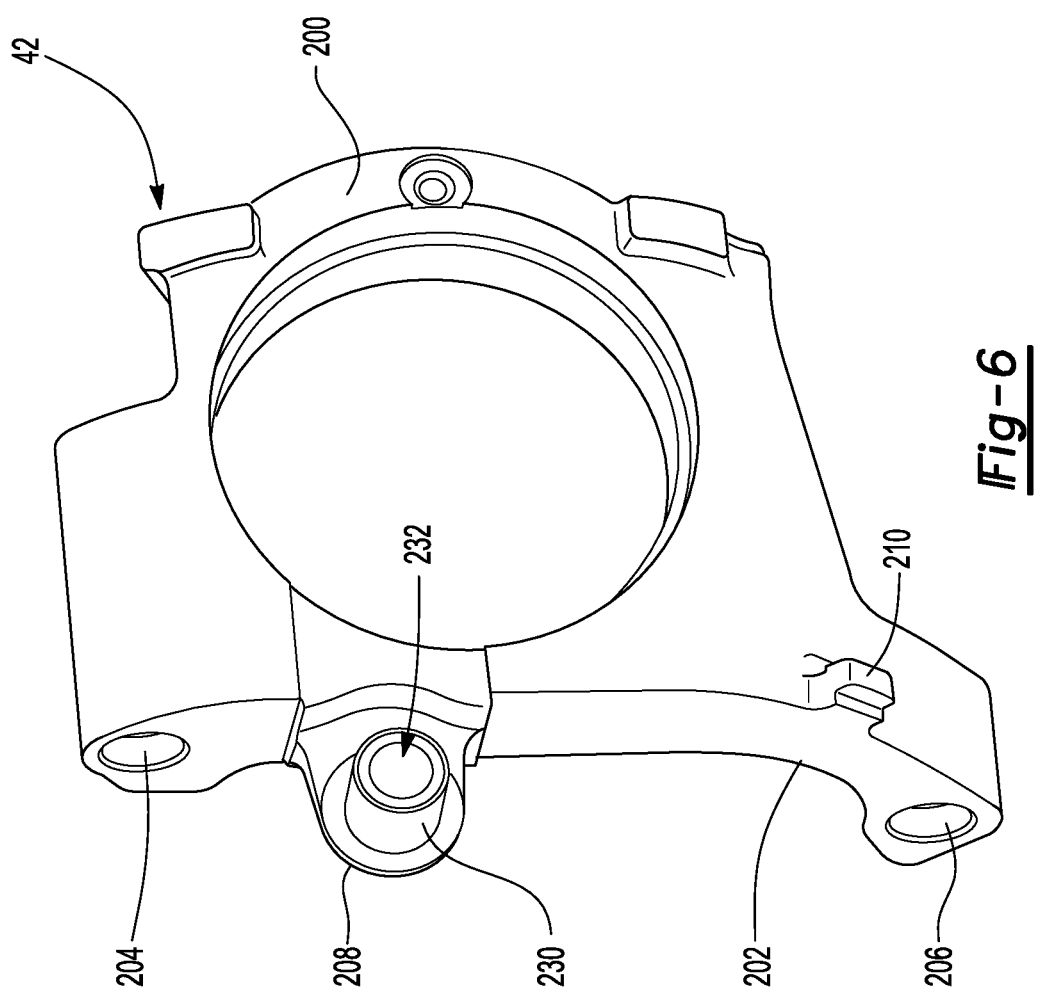
FIG. 6 is a perspective view of a differential bearing support of the differential carrier assembly.

Referring primarily to FIGS. 4 and 6, the differential bearing support 42 is mounted to the bearing support mount 64. The differential bearing support 42 receives a bearing assembly 160, which is best shown in FIG. 2, that rotatably supports the differential 44. The differential bearing support 42 may be a unitary one-piece component. As such, the differential bearing support 42 may encircle the bearing assembly 160 rather than have legs and a separate bearing cap like the bearing support 66. In at least one configuration, the differential bearing support 42 may have a ring 200, an arm 202, a first fastener hole 204, a second fastener hole 206, a boss 208, a tab 210 or combinations thereof.

The ring 200 may be disposed at or near the center of the differential bearing support 42. The ring 200 may encircle the bearing assembly 160. As such, the ring 200 may encircle the differential axis 74. The bearing assembly 160 that is mounted to the differential bearing support 42 is coaxially disposed with the bearing assembly 160 that is mounted to the bearing support 66.

The arm 202 extends from the ring 200. For instance, the arm 202 may extend downward and away from the ring 200 at an oblique angle. The arm 202 may engage or contact the second mount 114 of the bearing support mount 64. As is best shown in FIG. 3, the arm 202 may be disposed directly below or extend directly below the second axis 72.

Referring primarily to FIGS. 4 and 6, the first fastener hole 204 may be a through hole that extends through the differential bearing support 42. The first fastener hole 204 may be aligned with the first mount fastener hole 130 such that the fastener 132 may extend through the first fastener hole 204 to the first mount fastener hole 130 to couple or secure the differential bearing support 42 to the first mount 112. As is best shown with reference to FIG. 4, a first sleeve 220 may be received in the first fastener hole 204 and in the first mount fastener hole 130. The first sleeve 220 may help align the differential bearing support 42 to the first mount 112. The fastener 132 may extend through the first sleeve 220.

The second fastener hole 206 is spaced apart from the first fastener hole 204. The second fastener hole 206 may be disposed in the arm 202. For instance, the second fastener hole 206 may be disposed proximate a distal end of the arm 202. The second fastener hole 206 may be a through hole that extends through the arm 202. The second fastener hole 206 may be aligned with the second mount fastener hole 150 such that a fastener 132 extends through the second fastener hole 206 to the second mount fastener hole 150 to couple or secure the differential bearing support 42 to the second mount 114. As is best shown with reference to FIG. 4, a second sleeve 220 may be received in the second fastener hole 206 and in the second mount fastener hole 150. The second sleeve 220 may help align the differential bearing support 42 to the second mount 114. The fastener 132 may extend through the second sleeve 220.

Referring to FIGS. 4 and 6, the boss 208 is configured to support the differential lock actuator mechanism 58. The boss 208 may extend from the ring 200 in a direction that extends toward the first end 82 of the differential carrier body 60. For instance, the boss 208 may extend into the passage 84. As such, the boss 208 may be positioned between the first mount 112 and the second mount 114. In at least one configuration and as is best shown in FIG. 6, the boss 208 may have a collar 230 that may define an aperture 232 that may receive a portion of the differential lock actuator mechanism 58. The collar 230 may extend from the boss 208 in a direction that extends away from the cavity 80.

The tab 210 may extend from the differential bearing support 42 into the notch 104 of the mounting flange 62. For instance, the tab 210 may extend from the arm 202 in a direction that extends away from the cavity 80. The tab 210 may help align the differential bearing support 42 with the differential carrier body 60.

Referring primarily to FIG. 3, the differential 44 is configured to be at least partially received in the center portion 30 of the axle housing 20. The differential 44 may be rotatable about the differential axis 74 and may be rotatably supported by the bearing assemblies 160. The differential 44 may transmit torque to the axle shafts 24 and wheels. For example, the differential 44 may be operatively connected to the axle shafts 24 and may permit the axle shafts 24 to rotate at different rotational speeds in a manner known by those skilled in the art. The differential 44 may have a ring gear mounting flange 240 and a ring gear 242.

The ring gear mounting flange 240 facilitates mounting of the ring gear 242. The ring gear mounting flange 240 may encircle and may extend away from the differential axis 74. In addition, the ring gear mounting flange 240 may be disposed substantially perpendicular to the differential axis 74.

The ring gear mounting flange 240 is disposed in a ring gear mounting flange plane 140. For instance, the ring gear mounting flange plane 140 may be aligned with a face of the ring gear mounting flange 240 that faces toward the ring gear 242 or may extend through the ring gear mounting flange 240, such as through the center of the ring gear mounting flange 240. The ring gear mounting flange plane 140 is disposed substantially perpendicular to the differential axis plane 120. The ring gear 242 is configured to be mounted to the ring gear mounting flange 240. The ring gear 242 that may have teeth that may mate or mesh with the teeth of the gear portion 274 of the drive pinion 56. Accordingly, the differential 44 may receive torque from the drive pinion 56 via the ring gear 242 and transmit torque to the axle shafts 24.

Referring to FIGS. 1 and 2, the input yoke 46, if provided, may facilitate coupling of the axle assembly 10 to a torque source. The input yoke 46 may have any suitable configuration. For instance, the input yoke 46 may have a disc configuration as shown or may have a similar configuration as the output yoke 28. It is contemplated that the input yoke 46 may be omitted, such as when a torque source like an electric motor is integrated with the axle assembly 10. If provided, the input yoke 46 may be operatively connected to the input shaft 48.

Referring to FIG. 2, an example of an input shaft 48 is shown, noting that the input shaft 48 is slightly behind the section plane. The input shaft 48 may extend along and may be rotatable about a first axis 70. For example, the input shaft 48 may be rotatably supported by one or more bearings that may be disposed on the differential carrier body 60. The input shaft 48 may be operatively connected to the driven gear 54 and the output shaft 26 via the interaxle differential unit 50.

The interaxle differential unit 50 may accommodate or compensate for rotational speed differences between different drive axle assemblies, such as speed differences between the axle assembly 10 and a second axle assembly that is connected in series with the axle assembly 10. As an example, the interaxle differential unit 50 may operatively connect the input shaft 48 and the output shaft 26 and may allow the input shaft 48 and output shaft 26 to rotate at different speeds with respect to each other under various operating conditions. In at least one configuration, the interaxle differential unit 50 may include a first side gear 260, a second side gear 262, and a gear nest 264.

The first side gear 260 may be selectively couplable to the input shaft 48 such that the first side gear 260 is rotatable about the first axis 70. The first side gear 260 may have side gear teeth that may mesh with a pinion gear of the gear nest 264 and drive gear teeth that may mesh with the driven gear 54.

The second side gear 262 may be rotatable about the first axis 70 with the output shaft 26. The second side gear 262 may be inhibited from rotating about the first axis 70 with respect to the output shaft 26.

The gear nest 264 may have a case that receives one or more pinion gears 266 that mesh with the first side gear 260 and the second side gear 262. Each pinion gear 266 may be rotatably disposed on the shaft and may be rotatable with respect to the case.

The clutch collar 52, if provided, may be rotatable about the first axis 70 with the input shaft 48. In addition, the clutch collar 52 may be moveable along the first axis 70 to engage or disengage a first side gear 260 of the interaxle differential unit 50 and thus lock or unlock the interaxle differential unit 50. The input shaft 48 and the output shaft 26 may be rotatable together about the first axis 70 when the interaxle differential unit 50 is locked. Conversely, the input shaft 48 and the output shaft 26 may be rotatable about the first axis 70 with respect to each other when the interaxle differential unit 50 is unlocked.

The driven gear 54 may be rotatable about the second axis 72. For example, the driven gear 54 may be fixedly disposed on the drive pinion 56 or may be couplable to the drive pinion 56 such that the driven gear 54 and the drive pinion 56 may rotate together about the second axis 72. The driven gear 54 may include a plurality of teeth that may be generally arranged about an outside diameter of the driven gear 54 and that may mate or mesh with the teeth of a drive gear, such as the first side gear 260.

The drive pinion 56 may help operatively connect the torque source to the differential 44. The drive pinion 56 may be spaced apart from the input shaft 48 and may be configured to rotate about an axis, such as a second axis 72. In at least one configuration, the drive pinion 56 may have a shaft 272 and a gear portion 274. The shaft may extend along and may be rotatable about the second axis 72. The driven gear 54 may be mounted to the shaft 272. The gear portion 274 may extend from an end of the shaft 272 away from the second axis 72. The gear portion 274 may have teeth that mesh with teeth of the ring gear 242 of the differential 44.

Referring to FIGS. 3 and 4, differential lock actuator mechanism 58 may be operatively connected to a differential lock collar 280 that is actuatable to selectively lock the differential 44 to inhibit the axle shafts 24 from rotating with respect to each other. For instance, the differential lock actuator mechanism 58 may include an actuator that moves the differential lock collar 280 along the differential axis 74. The actuator may include or may be operatively connected to a shaft 282 which in turn is operatively connected to the differential lock collar 280 with a shift fork 284. The differential lock actuator mechanism 58 may be extend through the through hole 90 in the differential carrier body 60 and extend to the differential bearing support 42. For example, the shaft 282 of the differential lock actuator mechanism 58 may be supported by the collar 230 of the boss 208 of the differential bearing support 42, such as by being disposed in the aperture 232 of the collar 230. The shaft 282 and the shift fork 284 may move with respect to the collar 230 when the shaft 282 is actuated.

Referring to FIGS. 1 and 2, the axle shafts 24 may transmit torque from the differential 44 to corresponding wheel hubs and wheels. The axle shafts 24 may extend along and may be rotatable about an axis, which may be the differential axis 74. Each axle shaft 24 may have a first end and a second end. The first end may be operatively connected to the differential 44. The second end may be disposed opposite the first end and may be operatively connected to a wheel.

Referring to FIG. 2, the output shaft 26 may extend along and may be rotatable about the first axis 70. For instance, the output shaft 26 may be supported by one or more bearings that may be disposed on the axle housing 20. The output shaft 26 may be operatively connected to the interaxle differential unit 50. For example, the output shaft 26 may be coupled to the second side gear 262 and may be rotatable about the first axis 70 with the second side gear 262.

Referring to FIGS. 1 and 2, the output yoke 28 may facilitate coupling of the axle assembly 10 to another axle assembly. For instance, the output yoke 28 may be fixedly coupled to the output shaft 26 in any suitable manner, such as with mating splines and a fastener like a nut. The output yoke 28 may be operatively connected to a second axle assembly in any suitable manner, such as via a prop shaft. The output yoke 28 may have any suitable configuration. For example, the output yoke 28 may have a configuration similar to that shown or may have a disc configuration similar to that depicted for the input yoke 46.

An axle assembly and a differential carrier assembly as described above may allow a drive pinion having a larger diameter gear portion to be installed in a differential carrier assembly. This may be accomplished by using a removable differential bearing support that is designed to accommodate a larger diameter drive pinion. A larger diameter drive pinion allows an axle assembly to be provided with faster gear ratios, which provides better fuel economy or reduced energy usage. More specifically, as the gear portion of the drive pinion increases in diameter the gear ratio becomes numerically lower. The present invention allows a larger diameter drive pinion gear portion to be accommodated by positioning the removable differential bearing support closer to the drive pinion than the other bearing support and by configuring the differential bearing support and its mounting holes to provide more space for the gear portion. Providing more space may include extending the differential bearing support adjacent to the mounting flange of the differential carrier and extending the differential bearing support below the second axis. The present invention may allow a larger diameter drive pinion to be accommodated without enlarging the differential carrier body or redesigning the differential carrier body in a manner that adds parts and may increase cost and weight.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A differential carrier assembly comprising:
   a differential that is rotatable about a differential axis;
   a differential carrier that includes:
   a differential carrier body that has a first end and that encircles a second axis;
   a mounting flange that is disposed opposite the first end and that extends from the differential carrier body, wherein the mounting flange extends away from the second axis and has a mounting flange face that faces away from the first end and is adapted to engage an axle housing; and
   a bearing support mount that extends from the mounting flange toward the second axis, wherein the bearing support mount is recessed from the mounting flange face such that the bearing support mount is disposed closer to the first end than the mounting flange face is disposed to the first end, and the bearing support mount has a first mount and a second mount that is spaced apart from the first mount, wherein the differential carrier body defines a passage that extends from the mounting flange and that includes a through hole that extends from an exterior side of the differential carrier body, wherein the passage separates the first mount from the second mount;
   a differential bearing support that is mounted to the bearing support mount, wherein the differential bearing support receives a bearing assembly that rotatably supports the differential; and
   a differential lock actuator mechanism that is received in the through hole and extends to the differential bearing support.

2. The differential carrier assembly of claim 1 wherein the differential bearing support is a unitary one-piece component that encircles the bearing assembly.

3. The differential carrier assembly of claim 1 wherein a first mount fastener hole extends from the first mount and a second mount fastener hole extends from the second mount.

4. The differential carrier assembly of claim 3 wherein the differential bearing support has a first fastener hole, wherein a first sleeve is received in the first fastener hole and in the first mount fastener hole and a first fastener extends through the first sleeve and couples the differential bearing support to the first mount.

5. The differential carrier assembly of claim 4 wherein the differential bearing support has a second fastener hole that is spaced apart from the first fastener hole, wherein a second sleeve is received in the second fastener hole and the second mount fastener hole and a second fastener extends through the second sleeve and couples the differential bearing support to the second mount.

6. The differential carrier assembly of claim 1 wherein the differential bearing support has a boss that extends into the passage and that supports the differential lock actuator mechanism.

7. The differential carrier assembly of claim 6 wherein the boss has an aperture and the differential lock actuator mechanism extends into the aperture.

8. The differential carrier assembly of claim 1 wherein the mounting flange has a notch that extends away from the second axis, and the differential bearing support has a tab that is received in the notch.

9. The differential carrier assembly of claim 1 wherein the differential bearing support has a ring that encircles the bearing assembly, and an arm that extends from the ring at an oblique angle, wherein the arm defines a fastener hole.

10. The differential carrier assembly of claim 9 wherein the arm is disposed directly below the second axis.

11. The differential carrier assembly of claim 9 wherein a tab extends from the arm and is received in a notch in the mounting flange.

12. A differential carrier assembly comprising:
a differential that is rotatable about a differential axis and that has a ring gear mounting flange upon which a ring gear is disposed, wherein the ring gear mounting flange is disposed in a ring gear mounting flange plane that is disposed substantially perpendicular to the differential axis, and the differential axis is disposed in a differential axis plane that is disposed substantially perpendicular to the ring gear mounting flange plane;
a differential carrier that includes a bearing support mount that has a differential carrier body, a mounting flange that extends from the differential carrier body and that is adapted to be mounted to an axle housing, a bearing support having first and second legs that protrude past the mounting flange and out of the differential carrier body, a first mount fastener hole, and a second mount fastener hole, wherein the first mount fastener hole is disposed above the differential axis plane, the second mount fastener hole is disposed below the differential axis plane, and the first mount fastener hole is disposed further from the ring gear mounting flange plane than the second mount fastener hole is disposed from the ring gear mounting flange plane, and the first leg has a first leg fastener hole that is disposed above the differential axis plane and that is disposed closer to the differential axis plane than the first mount fastener hole is disposed to the differential axis plane; and
a differential bearing support that is mounted to the bearing support mount, wherein the differential bearing support receives a bearing assembly that rotatably supports the differential, and the bearing support supports a second bearing assembly that rotatably supports the differential.

13. The differential carrier assembly of claim 12 further comprising an input shaft that is rotatable about a first axis, wherein the first axis is disposed closer to the ring gear mounting flange plane than the first mount fastener hole is disposed to the ring gear mounting flange plane and the first axis is disposed further from the ring gear mounting flange plane than the second mount fastener hole is disposed from the ring gear mounting flange plane.

14. The differential carrier assembly of claim 12 wherein the first mount fastener hole is disposed closer to the differential axis plane than the second mount fastener hole is disposed to the differential axis plane.

15. The differential carrier assembly of claim 12 wherein a differential lock actuator mechanism extends to the differential bearing support.

16. The differential carrier assembly of claim 15 wherein the differential bearing support has a boss that supports the differential lock actuator mechanism.

17. The differential carrier assembly of claim 12 wherein the second leg has a second leg fastener hole that is disposed below the differential axis plane and that is disposed closer to the differential axis plane than the second mount fastener hole is disposed to the differential axis plane.

18. A differential carrier assembly comprising:
a differential that is rotatable about a differential axis and that has a ring gear mounting flange upon which a ring gear is disposed, wherein the ring gear mounting flange is disposed in a ring gear mounting flange plane that is disposed substantially perpendicular to the differential axis, and the differential axis is disposed in a differential axis plane that is disposed substantially perpendicular to the ring gear mounting flange plane;
an input shaft that is rotatable about a first axis;
a drive pinion that is rotatable about a second axis that differs from the first axis;
a differential carrier that includes a bearing support mount that has a first mount fastener hole and a second mount fastener hole, wherein the first mount fastener hole is disposed above the differential axis plane, the second mount fastener hole is disposed below the differential axis plane, wherein the first axis is disposed closer to the ring gear mounting flange plane than the first mount fastener hole is disposed to the ring gear mounting flange plane, and the first axis is disposed further from the ring gear mounting flange plane than the second axis and the second mount fastener hole are disposed from the ring gear mounting flange plane; and
a differential bearing support that is mounted to the bearing support mount, wherein the differential bearing support receives a bearing assembly that rotatably supports the differential.

19. The differential carrier assembly of claim 18 wherein the first mount fastener hole is disposed further from the ring gear mounting flange plane than the second mount fastener hole is disposed from the ring gear mounting flange plane.

* * * * *